United States Patent
Swan (10) Patent No.: US 8,675,517 B2
(45) Date of Patent: Mar. 18, 2014

(54) FILTERING OF MAP TOPOLOGY BASED ON NETWORK DISCOVERY CHARACTERISTICS (75) Inventor: Michael Jon Swan, Lafayette, CA (US)

(73) Assignee: Solarwinds Worldwide LLC, Austin, TX (US)

(*) Notice: Subject to any disclaimer, the term of this patent is extended or adjusted under 35 U.S.C. 154(b) by 585 days.

(21) Appl. No.: 12/153,536

(22) Filed: May 20, 2008

(65) Prior Publication Data

US 2009/0290513 A1 Nov. 26, 2009

(51) Int. Cl.
H04L 12/28 (2006.01)

(52) U.S. Cl.
USPC .......................................................... 370/254

(58) Field of Classification Search
None
See application file for complete search history.

(56) References Cited

U.S. PATENT DOCUMENTS

| 5,758,083 | A  | * | 5/1998  | Singh et al. ............... 370/254 |
| 6,396,810 | B1 | * | 5/2002  | Hebel ......................... 370/254 |
| 6,532,241 | B1 | * | 3/2003  | Ferguson et al. ........... 370/469 |
| 6,622,170 | B1 | * | 9/2003  | Harrison et al. ............ 709/221 |
| 7,024,199 | B1 | * | 4/2006  | Massie et al. ............... 370/351 |
| 7,047,297 | B2 | * | 5/2006  | Huntington et al. ........ 370/253 |
| 7,383,334 | B2 | * | 6/2008  | Wong et al. ................. 370/229 |
| 7,693,045 | B2 | * | 4/2010  | McGee et al. .............. 370/216 |
| 2002/0156612 | A1 | * | 10/2002 | Schulter et al. ............. 703/23 |
| 2003/0012163 | A1 | * | 1/2003  | Cafarelli et al. ............ 370/338 |
| 2004/0117460 | A1 | * | 6/2004  | Walsh et al. ................ 709/219 |
| 2005/0099958 | A1 | * | 5/2005  | Freedman ................... 370/252 |
| 2006/0092852 | A1 | * | 5/2006  | Janes .......................... 370/252 |
| 2006/0098670 | A1 | * | 5/2006  | Voit et al. ................... 370/401 |
| 2006/0182055 | A1 | * | 8/2006  | Coffee et al. ............... 370/328 |
| 2006/0245431 | A1 | * | 11/2006 | Morris ...................... 370/395.4 |
| 2007/0140131 | A1 | * | 6/2007  | Malloy et al. .............. 370/241 |
| 2007/0147269 | A1 | * | 6/2007  | Ettle et al. .................. 370/254 |
| 2007/0189249 | A1 | * | 8/2007  | Gurevich et al. ........... 370/338 |
| 2008/0285563 | A1 | * | 11/2008 | Ogishi ........................ 370/392 |

* cited by examiner

Primary Examiner — Gregory Sefcheck
Assistant Examiner — Joshua Smith
(74) Attorney, Agent, or Firm — Squire Sanders (US) LLP (57) ABSTRACT Embodiments of the present application enable a user to map a network topology and to then dynamically filter the map display by hiding or showing nodes based on discovery characteristics, such as Simple Network Management Protocol (SNMP) status, Active Directory (AD) Domain Controllers (DC) status, group membership status, etc. to allow customization of maps views. In particular, a topology mapping is formed by collecting topology data of a network and storing this topology data. Filtering criteria are received from a user, and the stored topology data is filtered using this received filtering criteria. The filtered topology data is then displayed to the user.

12 Claims, 5 Drawing Sheets

```
Define Mapping Criteria
210
```

Search for Nodes

220

```
Search for nodes in blocks of N IP
addresses using user-configured
discovery methods
221
```

```
If a hop count > 0 was
defined, repeat step 221
with newly discovered
network ranges until
hop count is reached
223
```

```
Determine Layer 3 connectivity from
discovered nodes.
222
```

```
Determine Layer 2 connectivity from
any discovered nodes identified as a
managed switch or hub.
224
```

```
Correlate Layer 2 and Layer 3 address
data from steps 221-224 by use of
address translation tables (ARP) and
Spanning Tree tables collected from
discovered SNMP-capable nodes.
225
```

```
Determine network connectivity by
examining each discovered nodes IP
address(es). Layer 2 connectivity is
used when available; Layer 3
connectivity is used otherwise.
226
```

```
Store Search Results
230
```

| Object Identifier 410 | Object Attributes 420 | | | | |
|---|---|---|---|---|---|
| | Object Type 430 | SNMP status 440 | AD Domain Controller status 450 | Group membership status 460 | Other Attributes 470 |
| 1 | | | | | |
| 2 | | | | | |
| ... | | | | | |
| N | | | | | |

Figure 5

FILTERING OF MAP TOPOLOGY BASED ON NETWORK DISCOVERY CHARACTERISTICS

FIELD OF THE INVENTION

Embodiments of the present application enable a user to map a network topology and to then dynamically filter the map display by hiding or showing nodes based on discovery characteristics, such as Simple Network Management Protocol (SNMP) status, Active Directory (AD) Domain Controllers (DC) status, group membership status, etc. to allow customization of maps views.

BACKGROUND OF THE INVENTION

Network topology is the study of the arrangement or mapping of the elements (links, nodes, etc.) of a network, especially the physical (real) and logical (virtual) interconnections between nodes. A local area network (LAN) is one example of a network that exhibits both a physical topology and a logical topology. Any given node in the LAN will have one or more links to one or more other nodes in the network and the mapping of these links and nodes onto a graph results in a geometrical shape that determines the physical topology of the network. Likewise, the mapping of the flow of data between the nodes in the network determines the logical topology of the network.

Thus, network topology describes the specific physical or logical arrangement of the elements of a network. The elements may be physical or logical such that physical elements are real, and logical elements may be, for example virtual elements or an arrangement of the elements of a network. Two networks may share a similar topology if the connection configuration is the same, although the networks may differ in other aspects such as physical interconnections, domains, distances between nodes, transmission rates, and/or signal types. A network may incorporate multiple smaller networks. By way of example, a private telephone exchange is a network and that network is part of a local telephone exchange. The local exchange is part of a larger network of telephones which permit international calls, and is networked with cellular telephone networks.

Any particular network topology is determined only by the graphical mapping of the configuration of physical and/or logical connections between nodes. LAN Network Topology is, therefore, technically a part of graph theory. Distances between nodes, physical interconnections, transmission rates, and/or signal types may differ in two networks and yet their topologies may be identical. The arrangement or mapping of the elements of a network gives rise to certain basic topologies which may then be combined to form more complex topologies (hybrid topologies). The most common of these basic types of topologies include bus (such as Linear, Distributed Bus), star, ring, mesh (including a partially connected or a fully connected mesh), tree, hybrid that is composed of one or more network topologies, and point-to-Point.

Logical topology corresponds to a mapping of the apparent connections between the nodes of a network, as evidenced by the path that data appears to take when traveling between the nodes. The logical classification of network topologies generally follows the same classifications as those in the physical classifications of network topologies, the path that the data takes between nodes being used to determine the topology as opposed to the actual physical connections being used to determine the topology. Logical topologies are often closely associated with media access control (MAC) methods and protocols. The logical topologies are generally determined by network protocols as opposed to being determined by the physical layout of cables, wires, and network devices or by the flow of the electrical signals, although in many cases the paths that the electrical signals take between nodes may closely match the logical flow of data, hence the convention of using the terms 'logical topology' and 'signal topology' interchangeably. Logical topologies are typically able to be dynamically reconfigured by special types of equipment such as routers and switches.

With ever increasing network size and complexity, it become increasingly difficult for user to interpret and use topology maps. Often, even a modest sized local network may include hundreds or thousands of nodes, each have one or more connections to other nodes. This volume of topology data leads to difficulty in interpreting and using topology maps.

Thus, if a user needs to identify nodes within a certain group, such as nodes of a particular type, area, or other characteristic, this task may be difficult to accomplish using existing tools and methodologies. For example, certain conventional mapping may not be able to identify and otherwise distinguish between different network types or groups. Similar, even if conventional topology data collection methods could determine such information, the topology data display methods/devices associated with the conventional techniques typically cannot filter and display the desired subset of the topology data.

SUMMARY OF THE INVENTION

In response to these and other needs, embodiments of the present application enable a user to map a network topology and to then dynamically filter the map display by hiding or showing nodes based on discovery characteristics, such as SNMP status, AD DC status, group membership status, etc. to allow customization of maps views.

In particular, embodiments of the present application relate to forming a filtered topology mapping by collecting topology data of a network and storing this topology data. Filtering criteria are received from a user, and the stored topology data is filtered using this received filtering criteria. The filtered topology data is then displayed to the user.

In embodiments of the present application, the collecting of topology data includes generating synthetic data within the network; and tracing the synthetic data. For example, this collecting of topology data may include searching for nodes in a pre-defined number of Internet Protocol (IP) addresses, and repeating the search for a predefined number of hops. Layer-2 and Layer-3 connectivity may be determined from any discovered nodes, and the Layer-2 and Layer-3 address data is correlated. Network connectivity of discovered IP addresses may then be determined.

The collection of the topology data may be customized by user supplied collection criteria. For example, a user may specify the size of the block of IP addresses and the number of hops.

After the topology data is collected, the user may specify one or more the filtering criteria, such as selecting of one or more attributes of the stored topology objects. Exemplary object attributes include object type, status, AD DC status, and group membership status.

DESCRIPTION OF THE DRAWINGS BRIEF

For proper understanding of the invention, reference should be made to the accompanying drawings, wherein.

DETAILED DESCRIPTION OF THE PREFERRED EMBODIMENTS

Figure 1:
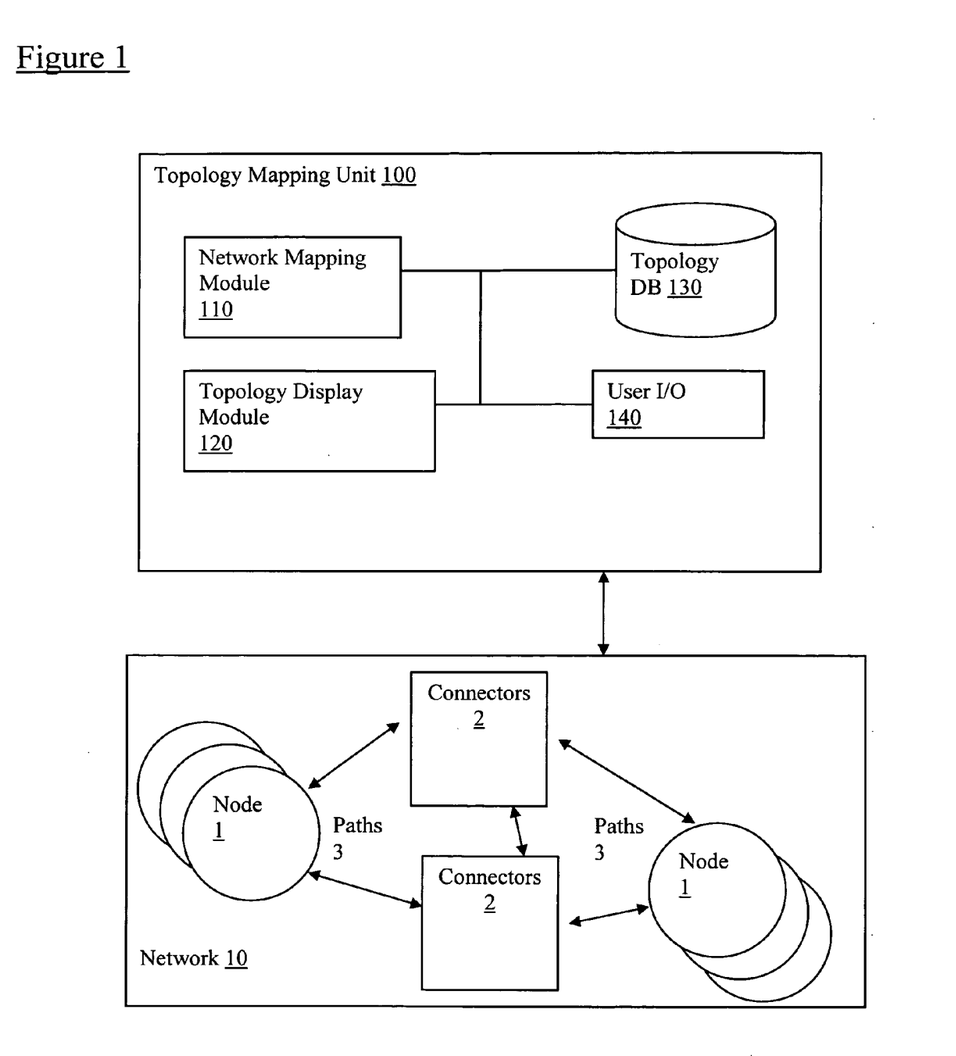
FIG. 1 is a high level schematic diagram of a topology mapping and filtering system in accordance with embodiments of the present application.

Referring to FIG. 1, embodiments of the present application relate to a topology mapping unit 100 configured to connect to network 10 that includes, for example, multiple nodes 1, connectors 2, and paths 3.

The topology mapping unit 100 includes a mapping module 110. In particular, the mapping module 110 is configured to map components in the network 10. Various network topography mapping techniques are known and may be integrated within the embodiments of the present application, as described in greater detail below.

The mapping module 110 automatically discovers everything on the network, including desktops, servers, printers, switches and routers using identification and discovery methods (ping/ICMP, SNMP, SIP-based VoIP, NetBIOS and more) to scan IP address ranges and find nodes, as described below in FIG. 2. and other embodiments of the present application.

Figure 2:
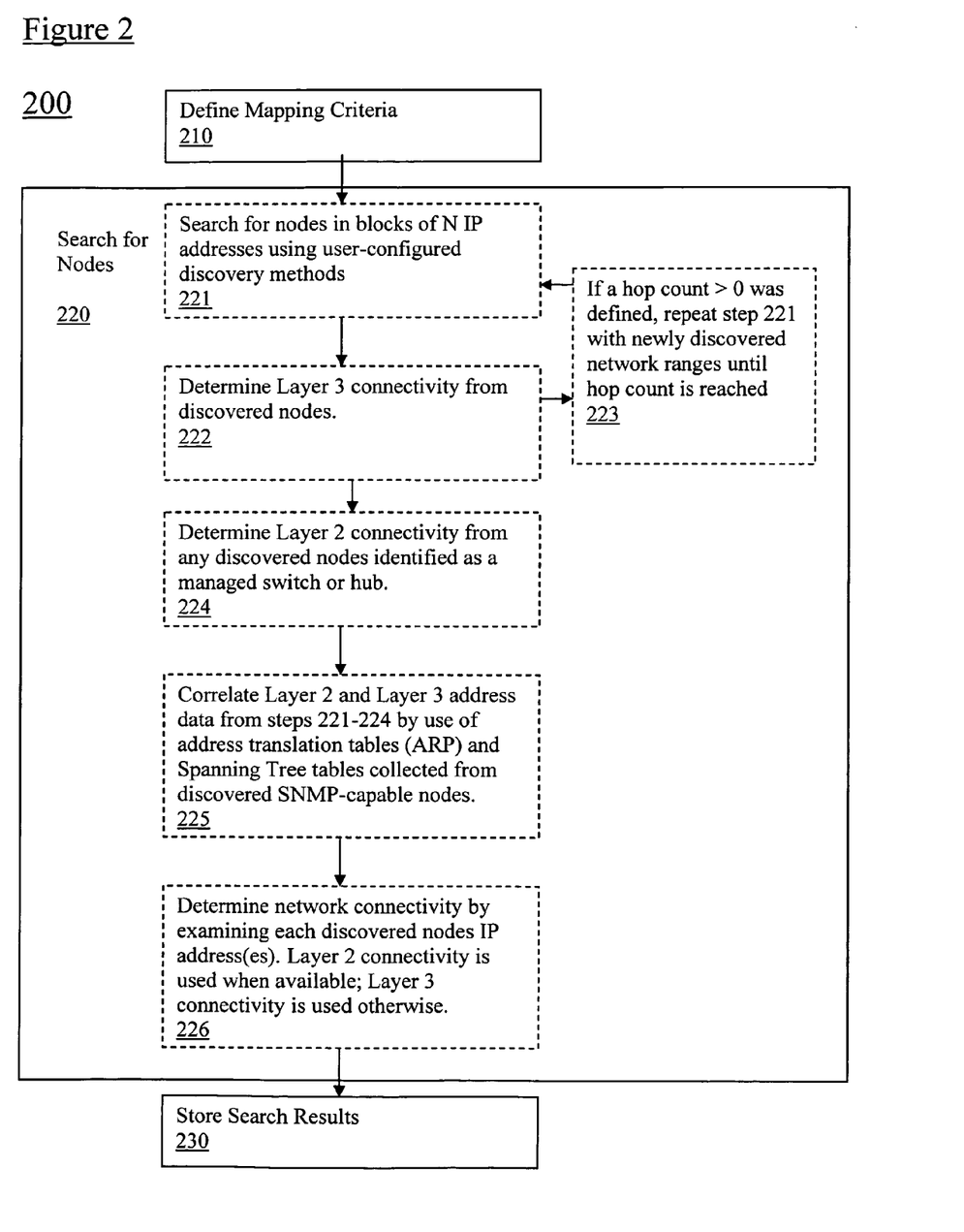
FIG. 2 is a flow chart of a network mapping method in accordance with embodiments of the present application.

Referring now to FIG. 2, a mapping method 200 in accordance with embodiments of the present application is provided. In particular, the mapping method 200 includes the step of defining mapping data criteria in step 210. For example, a user may define a range of IP addresses, the number of hops (or connected devices from each discovered device), and types of devices (e.g., SNMP devices or responder clients) to be discovered during the search.

Continuing with FIG. 2, in step 220, a node search is performed. For example, types of discovery methods such as ICMP Ping, NetBIOS, SIP clients, etc. entail transmission of small UDP or ICMP packets to each IP address in the defined range, as well as discovery of devices within the number hops from the devices discovered. Thus, data is sent and tracked for each defined IP address to determine the device associated with an IP address and the physical and virtual paths used to reach the respective IP address. Optionally, large IP address ranges are subdivided into fixed blocks of addresses, such as blocks of 30 address, with responses searched from those addresses. By searching the network in this way with small data packets being exchanged with a limited number of addresses, noticeable affects are minimized in network bandwidth or devices.

Continuing with FIG. 2, the node discovery in step 220 is described in greater detail. Search for nodes in blocks of a pre-selected number N of IP addresses using user-configured discovery methods, step 221. Then, the Layer-3 connectivity can be determined from discovered nodes in step 222. If a hop count >0 was defined, repeat step 221 with newly discovered network ranges until hop count is reached, step 223. Then, Layer-2 connectivity is determined from any discovered nodes identified as a managed switch in step 224. The Layer-2 and Layer-3 address data from steps 221-224 are then correlated, for example, by use of address translation tables (ARP) and Spanning Tree tables collected from discovered SNMP-capable nodes in step 225. Then, the network connectivity is determined in step 226 by examining each discovered nodes IP address(es). Layer-2 connectivity is used when available; Layer-3 connectivity is used otherwise.

The network topology search results are stored in step 230. For example, the mapping module 110 may collect and store all topology information in a database 140, providing a source of topology and asset information for enterprise configuration management database (CMDB) strategies. The mapping module 110 also automatically maintains this data to update the network nodes, thereby, providing network engineers with a constantly-accurate representation of the network for visibility and compliance requirements.

Optionally, the network topology search results are stored in step 230. For example, once network nodes are discovered, the mapping module 110 may compile the information into a cohesive, easy-to-view network topology map, for example, with node icons and colored lines representing network connectivity speed on a user interface 130. In this way, the mapping module 110 enables network engineers to see exactly how devices in the network are connected. The mapping module 110 can access managed switches to accurately diagram port connectivity for all network devices, resulting in a complete map that illustrates all nodes connected directly to a managed switch with the port information displayed adjacent to the node.

Another approach to automatically determining the data link layer topology of large, dynamic LANs may be called the MAC-based approach. The MAC-based approach takes advantage of MAC address information contained in Management Information Bases (MIBs) to determine a LAN's data link layer topology. MIBs are described in the Internet Engineering Task Force (IETF) Request For Comments (RFC) 1156 and in IETF RFC 1213.

Returning back to FIG. 1, in one implementation of the present application, the mapping module 110 performs Layer-2 mapping. Layer-2, or the data link layer, provides the functional and procedural means to transfer data between network entities and to detect and possibly correct errors that may occur in the physical layer. Originally, this layer was intended for point-to-point and point-to-multipoint media, characteristic of wide area media in the telephone system. Local area network (LAN) architecture, which included broadcast-capable multi-access media, was developed independently of the ISO work, in IEEE Project 802. LAN services typically arrange bits, from the physical layer, into logical sequences called frames.

The uppermost sublayer is Logical Link Control (LLC). This sublayer multiplexes protocols running atop the data link layer, and optionally provides flow control, acknowledgment, and error recovery. The LLC provides addressing and control of the data link. It specifies which mechanisms are to be used for addressing stations over the transmission medium and for controlling the data exchanged between the originator and recipient machines.

The sublayer below the LLC is the Media Access Control (MAC). Sometimes this refers to the sublayer that determines who is allowed to access the media at any one time (usually CSMA/CD), and other times this phrase refers to a frame structure with MAC addresses inside. There are generally two forms of media access control: distributed and centralized. The Media Access Control sublayer also determines where one frame of data ends and the next one starts.

Continuing with FIG. 1, in one implementation of the present application, the mapping module 110 performs Layer-3 mapping. Layer-3, or the network layer, is the third layer out of seven in the OSI model and the third layer out of five in the TCP/IP model. In essence, the network layer is responsible for end to end (source to destination) packet delivery, whereas the data link layer is responsible for node to node (hop to hop) frame delivery. The network layer provides the functional and procedural means of transferring variable length data sequences from a source to a destination via one or more networks while maintaining the quality of service, and error control functions. The network layer deals with transmitting information all the way from its source to its destination.

By performing multi-level discovery, the mapping module 110 leverages multiple discovery methods to provide an integrated OSI Layer-2 and Layer-3 topology map to include
 IP address
 MAC address
 Last logged-in user
 DNS name
 Node name (determined by SNMP or other client protocol)
 Switch port connection
This topology data may then be stored in a topology database 130.

This multi-level discovery of network infrastructure data in topology database 130 provides a user with easy access to significant time-saving features, including automated representation of topology at levels, to show routers and subnets, additionally managed switches, or additionally, end nodes that can be filtered by type or group to further refine layouts.

Continuing with FIG. 1, the mapping module 110 may also perform other operations to collect additional topology information. For example, the mapping module 110 may discover Active Directory (AD) Domain Controllers (DC) through a topography mapping as described above in FIG. 2 to form a topological network map. The mapping module 110 may then use Lightweight Directory Access Protocol (LDAP) queries and analysis of returned data to identify the AD DC, and then integrate the devices running the LDAP into the topological map. For example, the topology of a network, such as the nodes and connections in the network are determined. Next, LDAP connections are created (bound) to either (a) the current users LDAP endpoint ("server") or (b) if the user has specified one or more domain credentials, to the LDAP endpoint associated with those credentials. LDAP connections can be created using conventional techniques and commands. Next, an LDAP data search is performed using the created connections to return any known Fully Qualified Domain Names (FQDN) of the DC. A reverse-Domain Name Server (DNS) lookup is then performed for each of the discovered DC in order to establish IP addresses for the DC. Any of the DC which is found to have an IP address within the network address ranges discovered in the network topology may be inserted into the existing list of discovered nodes, each identified as a DC. Finally, the LDAP connections are closed or unbound.

Likewise, other known techniques can be combined with the above-described topology mapping techniques to otherwise interpret the data returned from the various nodes, as need to meaningfully characterized the discovered nodes. For example, the topology data may be used to classify various discovery characteristics of the topology nodes, such as SNMP status, AD DC status, group membership status, etc.

Continuing with FIG. 1, the topology mapping unit 100 further includes a topology data display unit 120. In particular, once the mapping module 110 has formed a topology map, the topology data display unit 120 may use this mapping data to form a graphical display, or equivalent output, as described below in FIGS. 3 and 5. In particular, topology data display unit 120 is adapted to receive user preferences from a use input/output device (I/O) 140, and then use these preferences to filter and display the desired topology information, typically also through the user I/O device 140.

Figure 3:
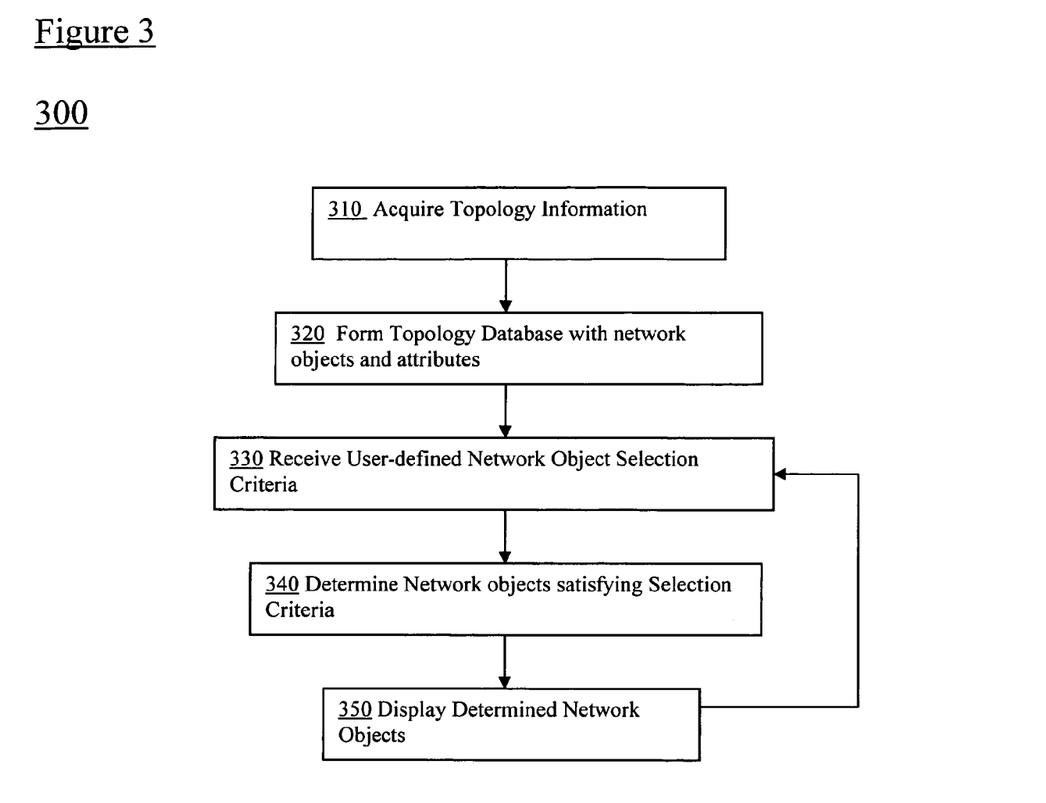
FIG. 3 is a flow chart of a topology filtering method in accordance with embodiments of the present application.

Referring now to FIG. 3, certain implementation of the present application related to a topology data filtering and displaying method 300. As depicted in step 310, the topology data can be acquired. For example, the methodology 200 discussed in FIG. 2 may be implemented. Alternatively, the conventional mapping techniques may be implemented in step 310 as well. This topology data is then stored in step 320, for example, in topology DB 130, such as through a relational database.

Figure 4:
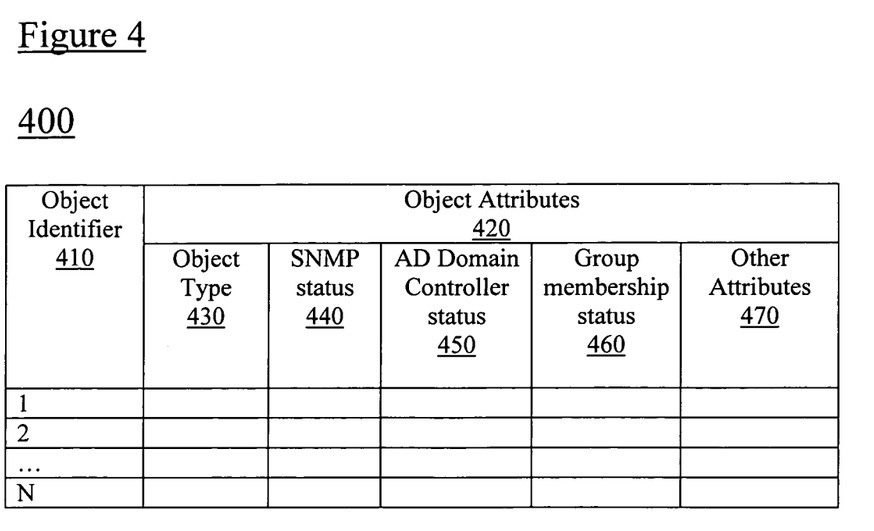
FIG. 4 is a table depicting exemplary topology data in accordance with embodiments of the present application.

Referring now to FIG. 4, a topology data table 400 depicting exemplary topology data is now described. For example, for each of a number N of discovered network nodes, specified by object identifier 410, the table 400 may define various object attributes 420 of the discovered nodes. For example, for each of the topology objects identified in row 410, the table 400 may include object attributes 420 such as object type 430, SNMP status 440, AD DC status 450, group membership status 460, etc. For example, object type 430 may include one or more roles of a network device, such as whether the device is SNMP-capable, a switch, a router, etc. Referring to group membership status, this criteria may be defined as needed during topology mapping. For example, the group membership status may indicate whether the discovered node is located in a particular location, performs a particular function, or shares a particular connection with another node.

Continuing with FIG. 3, filtering information/preferences are then received from user in step 330. The information typically comes from users in response to some type of prompt, such as an inquiry from an application unit related to the topology mapping unit 110. This information received in step 330 is then used in step 340 to filter the topology data acquired and stored, respectively in step 310 and 320. For example, the selection criteria received in step 330 may be used to define one or more Boolean expression that are used to filter the topology data, such as those depicted in table 400 of FIG. 4. For example, as described above, the table 400 may store object attributes 420 for various objects 410 discovered during the collection of topology data in step 310. For example, the selection criteria received and processed in step 330 may specify object attributes 420 such as object type 430, SNMP status 440, AD DC status 450, group membership status 460, etc.

Specific topology objects 410 satisfying the selection criteria in step 330 are then identified in step 340. The identified objects from step 340 can then be presented in the user in step 350, typically in the form of a graphically display. The user may then view the filtered topology mapping and repeat the process to either request further limitations, thereby further filtering the topology mapping, or relaxing the requested requirements in step 330 to expand the number of topology objects included in the topology mapping.

Figure 5:
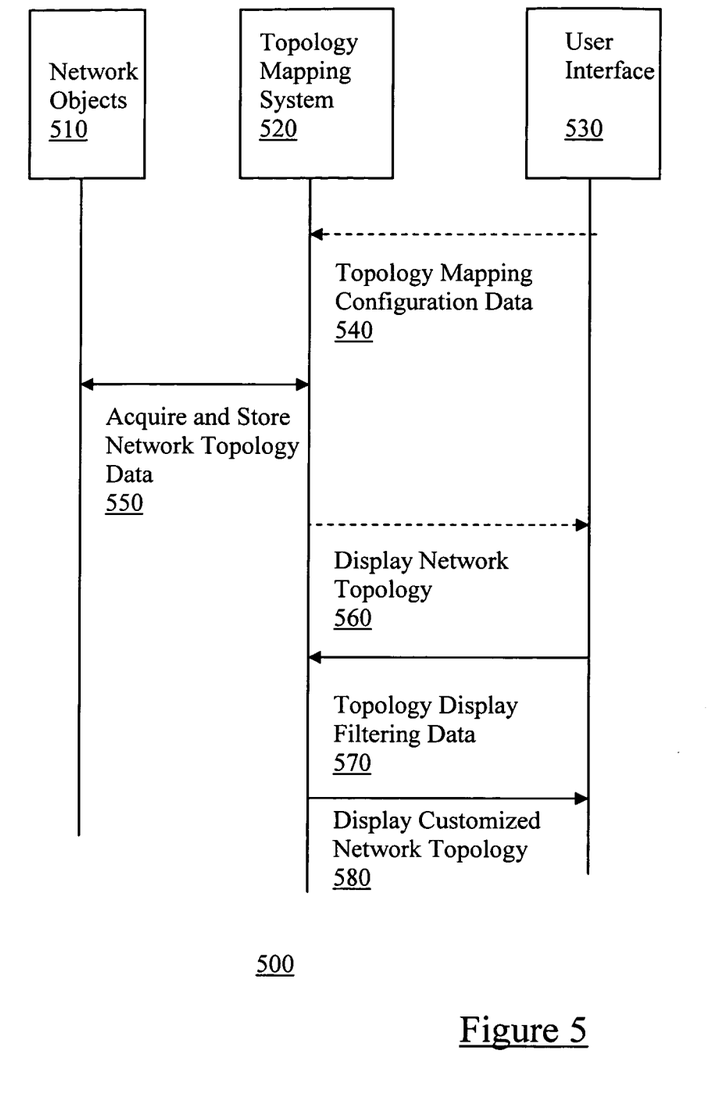
FIG. 5 is a process diagram depicting messages exchanged in a topology filtering method in accordance with embodiments of the present application.

Referring now to FIG. 5, a process flow diagram 50 depicted various communications between the network objects 510, the mapping module 520, and a user 530. The user 530 may forward a message 540 to define the topology search criteria. For example, as defined above, a user may define an initial IP address for searching, a range of IP addresses to be searched, the number of IP addresses to be search at any time, etc. The mopping module 520 uses message 540 to perform the discovery of network objects 510 through an exchange of messages 550, for example, as described above topology mapping method 200 in FIG. 2.

Optionally, the entire discover topology data may be presented to the user in message 560. The user then forward message 570 to define the topology filtering criteria, as described above. For example, the message 570 may specify object attributes 420 such as object type 430, SNMP status 440, AD DC status 450, group membership status 460, etc. The mapping unit 520 then processes the topology filtering criteria message 560, and uses this data to return the filtered topology data to the user via message 580, which is customized for the user's needs, as defined by the filtering criteria message 560.

As discussed above, various embodiments of the invention can be configured in numerous physical elements, or can be configured at a single network element or configured in a number of elements having various disclosed functions distributed throughout. The control of the IP SLA or other monitoring configurations and other functions can be performed at various network components, such as at user equipment, at VOIP server, at an access gateway or at another network component associated with the VOIP network and access to the network.

A person of ordinary skill in the art would understand that the above-discussed embodiments of the invention are for illustrative purposes only, and that the invention can be embodied in numerous configurations as discussed above. Additionally, the invention can be implemented as a computer program on a computer readable medium, where the computer program controls a computer or a processor to perform the various functions which are discussed as method steps and also discussed as hardware or hardware/software elements.

What is claimed:

1. A method for forming a filtered topology mapping, comprising:
    collecting topology data of a network;
    storing said topology data;
    receiving filtering criteria from a user, wherein the filtering criteria comprises a selection of one or more object attributes of the stored topology data;
    filtering the stored topology data using said filtering criteria; and
    forwarding said filtered topology data to the user,
    wherein the collecting of topology data comprises:
        searching for nodes in a pre-defined number of internet protocol (IP) addresses;
        repeating the search for a predefined number of hops;
        determining Layer-2 and Layer-3 connectivity from any of the nodes discovered during the search;
        correlating Layer-2 and Layer-3 address data; and
        determining network connectivity by examining the internet protocol (IP) addresses of each of the nodes discovered during the search,
    wherein the Layer-2 connectivity is used when available, and Layer-3 connectivity is used when the Layer-2 connectivity is not available.

2. The method of claim 1, wherein the collecting of topology data comprises:
    generating synthetic data within the network; and tracing the synthetic data.

3. The method of claim 1, wherein the collecting of the topology data comprises receiving and storing user preferences comprising a size of the block of IP addresses and the number of hops.

4. The method of claim 1, wherein the object attributes comprise object type, simple network management protocol (SNMP) status, active directory (AD) domain controller (DC) status, and group membership status.

5. A computer program embodied on a non-transitory computer-readable medium configured to form a filtered topology mapping by controlling a processor to perform:
    collecting topology data of a network;
    storing said topology data;
    receiving filtering criteria from a user, wherein the filtering criteria comprises a selection of one or more object attributes of the stored topology data;
    filtering the stored topology data using said filtering criteria; and
    displaying said filtered topology data to the user,
    wherein the mapping the topology of the network comprises:
        searching for nodes in a pre-defined number of IP addresses;
        repeating the search for a predefined number of hops;
        determining Layer-2 and Layer-3 connectivity from any of the nodes discovered during the search;
        correlating Layer-2 and Layer-3 address data; and
        determining network connectivity by examining the IP addresses of each of the nodes discovered during the search,
    wherein the Layer-2 connectivity is used when available, and Layer-3 connectivity is used when the Layer-2 connectivity is not available.

6. The program of claim 5, wherein the mapping a topology of a network comprises: generating synthetic data within the network; and tracing the synthetic data.

7. The program of claim 5, wherein the collecting of the topology data comprises receiving and storing user preferences comprising a size of the block of IP addresses and the number of hops.

8. The program of claim 5, wherein the object attributes comprise object type, simple network management protocol (SNMP) status, active directory (AD) domain controller (DC) status, and group membership status.

9. An apparatus for discovering an network topology comprising a server configured to:
    collect topology data of a network;
    store said topology data;
    receive filtering criteria from a user, wherein the filtering criteria comprises a selection of one or more object attributes of the stored topology data;
    filter the stored topology data using said filtering criteria; and
    display said filtered topology data to the user,
    wherein, when mapping the topology the network, the server is further configured to:
        search for nodes in a pre-defined number of internet protocol (IP) addresses;
        repeat the search for a predefined number of hops;
        determine Layer-2 and Layer-3 connectivity from any of the nodes discovered during the search;
        correlate Layer-2 and Layer-3 address data; and
        determine network connectivity by examining the IP addresses of each of the nodes discovered during the search,
    wherein the Layer-2 connectivity is used when available, and Layer-3 connectivity is used when the Layer-2 connectivity is not available.

10. The apparatus of claim 9, wherein the server, in the mapping a topology of the network, is further configured to transfer synthetic data within the network, and trace the synthetic data.

11. The apparatus of claim 9, wherein the server, when mapping the topology of the network, is further configured to receive and store user preferences comprising the size of the block of IP addresses and the number of hops.

12. The apparatus of claim 9, wherein the object attributes comprise object type, simple network management protocol (SNMP) status, active directory (AD) domain controller (DC) status, and group membership status.

\* \* \* \* \*